April 5, 1938.　　　　E. W. DOTTEN　　　　2,113,294
ENGINE HOOD COVER
Filed March 13, 1937

INVENTOR.
Earl W. Dotten.
BY
Geo. Stevens.
ATTORNEY.

Patented Apr. 5, 1938

2,113,294

UNITED STATES PATENT OFFICE 2,113,294

ENGINE HOOD COVER

Earl W. Dotten, Cromwell, Minn.

Application March 13, 1937, Serial No. 130,793

3 Claims. (Cl. 108—3)

This invention relates to automobile engine covers or cozies, and has special reference to a conveniently applied means for temporary protection and heating of an automobile engine including the hood and immediate attachments thereabouts.

The principal object of the invention is to provide a simple, cheap and convenient device of this character, more efficient than heretofore employed.

Other objects and advantages of the invention will appear in the following description thereof.

Referring now to the accompanying drawing, forming part of this application, and wherein like reference characters indicate like parts:

Figure 1:
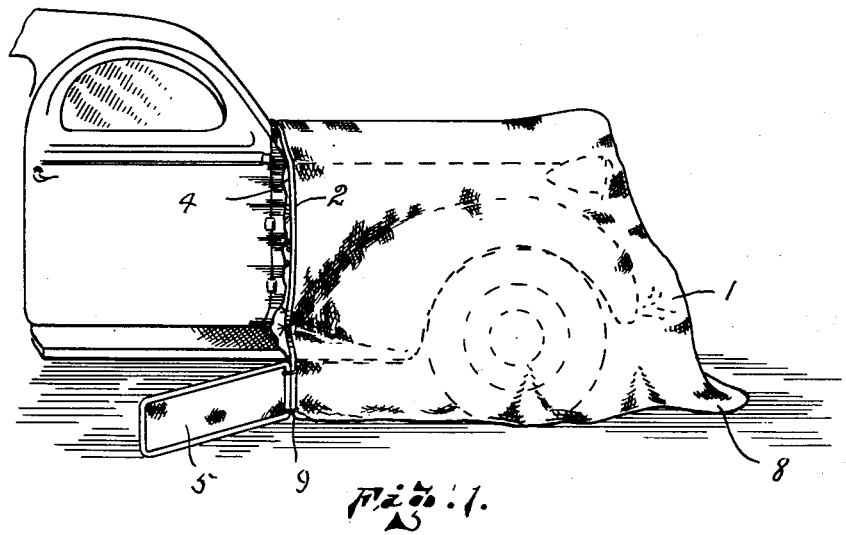
Figure 1 is an elevation, somewhat in perspective, of the forward end of an automobile, partially housed by one embodiment of the invention.
Figure 2:
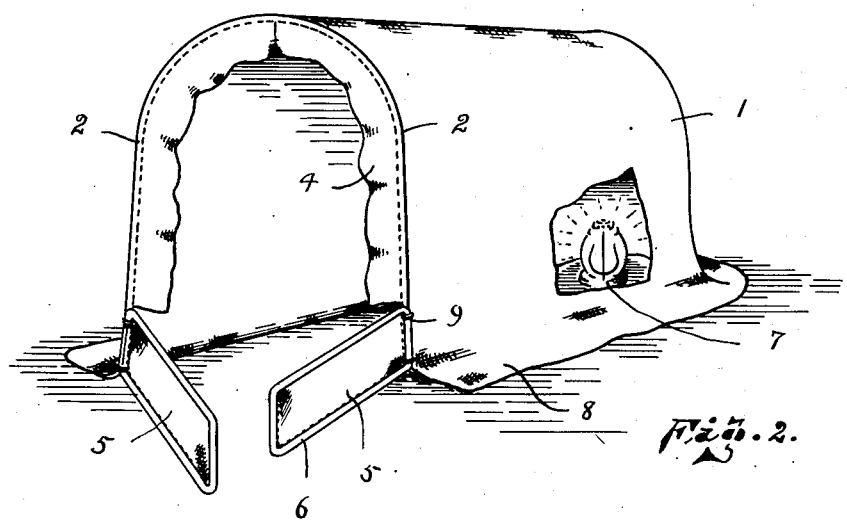
Figure 2 is a similar view of a like embodiment of the invention, somewhat enlarged, and as it might appear in upright position.
Figure 3:
Figure 3 is a perspective view of a fragmental portion of the housing showing the manner of reinforcing the hem thereof.

1 represents a tent like structure preferably made of a good firm quality of canvas, and sufficiently large to encompass the entire forward end of an ordinary automobile or truck as the case may be, and when in such position to be of sufficient size for a portion thereof to lie prone upon the ground thereabouts to insure against wind or air circulating freely thereunder.

The forward end of this tent is preferably inclosed and so shaped as to fit loosely over the forward end of the automobile, and the rearmost open end of the tent is of inverted U-shape and preferably reinforced as at 2 by a stiffening member such as a rope indicated at 3, or possibly a piece of small garden hose or the like, to insure a stability of the open edge of the member, and from which border is shown as extending inwardly therefrom a flounce 4 or comparatively narrow extension of the tent material, this being for the purpose of acting as additional means for preventing circulation of air in passing intermediate of the exterior of the car and the tent. This flounce does not extend the full length of the reinforced inner end of the tent but terminates just above the attachment of the adjustable wings 5 of the device which are preferably of a material similar to that of which the tent is made and bordered as by a reinforcing member illustrated at 6 so that they will normally stand substantially upright when swung around beneath the car where they preferably overlap, being made sufficiently long intentionally for that purpose. These wings are also for the purpose of preventing circulation of air from beneath the tent rearwardly of the car, or at times to prevent air circulation in the opposite direction when the draft happens to be that way.

It will be noted, that this construction, being flexible and yieldable, will permit of convenient folding or rolling into the least space possible for transportation, and, when the device is applied to the forward end of a car and the weather is dangerously cold a heater, such as illustrated at 7 for example, may be installed in any convenient position beneath the tent to insure against freezing of the cooling water of the engine, or undue thickening of the engine oil. It is obvious that this heater may be an electric heater, or an individual heating unit such as a lantern, or the like, as illustrated.

It is apparent that the reinforcing rope or cord 3 may extend wholly about the flange like border 8 of the tent to insure its lying most closely upon the ground and avoid the possibility of wind moving same or interfere with its efficiency as a protection.

It will be noted too that the wings 5 are hingedly attached as at 9 to the reinforced inner end of the tent for convenience in swinging the wings to overlapped position underneath the car.

Having thus described my invention, what I claim and desire to secure by Letters Patent, is:

1. An auto engine cozy comprising a covering of substantially inverted U-shape in cross section, open at one end and closed at the other, and two relatively narrow cooperable flaps swingably united each at one end to opposite lowermost portions of the open end of said covering for complete and snug temporary housing of the lowermost front end of an automobile.

2. In combination a tent shaped for complete coverage of the front end of an automobile, a hem about the border of the open end of said tent, a flounce extending inwardly from said hem and to within a spaced distance from either corner of said open end, and a flap swingably attached to said hem adjacent the termination of either end of said flounce and spaced from the extreme corners of said tent.

3. An automobile cozy of the type described comprising a tent open at one end and closed at the other for entire coverage of the front of an automobile, and cooperative flaps attached one adjacent either lowermost corner of the open end of said tent and swingable underneath an automobile when the cozy is applied thereto.

EARL W. DOTTEN.